United States Patent
Saha et al.

(10) Patent No.: US 9,973,665 B2
(45) Date of Patent: May 15, 2018

(54) SYSTEM AND METHOD FOR SENSOR ADJUSTMENT

(71) Applicant: GE LIGHTING SOLUTIONS, LLC, East Cleveland, OH (US)

(72) Inventors: Koushik Babi Saha, Strongsville, OH (US); Thomas Clynne, East Cleveland, OH (US); Jonathan Robert Meyer, Shaker Heights, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days. days.

(21) Appl. No.: 14/982,124

(22) Filed: Dec. 29, 2015

(65) Prior Publication Data
US 2017/0126936 A1    May 4, 2017

Related U.S. Application Data

(60) Provisional application No. 62/250,469, filed on Nov. 3, 2015.

(51) Int. Cl.
*H04N 5/225* (2006.01)
*F16M 13/02* (2006.01)

(52) U.S. Cl.
CPC ........ *H04N 5/2252* (2013.01); *F16M 13/022* (2013.01)

(58) Field of Classification Search
CPC .. H04N 5/2251; H04N 5/2252; H04N 5/2254; H04N 5/2255; F16M 13/00; F16M 13/005; F16M 13/022
USPC .......................................................... 348/373
See application file for complete search history.

(56) References Cited

U.S. PATENT DOCUMENTS

| | | | | |
|---|---|---|---|---|
| 6,116,485 A | * | 9/2000 | Watkins | B60R 11/04 224/275 |
| 6,375,369 B1 | * | 4/2002 | Schneider | G03B 17/02 348/143 |
| 6,762,790 B1 | * | 7/2004 | Matko | B60R 11/04 250/239 |
| 7,298,869 B1 | * | 11/2007 | Abernathy | G06K 9/0063 324/323 |
| 7,298,969 B2 | * | 11/2007 | Elberbaum | F16M 11/18 348/373 |
| 7,586,537 B2 | * | 9/2009 | Konishi | G03B 37/02 348/143 |
| 7,815,379 B2 | * | 10/2010 | Sato | G08B 13/19619 348/143 |
| 7,967,371 B2 | * | 6/2011 | Khanna | H04N 5/2251 296/187.01 |

(Continued)

*Primary Examiner* — Pritham Prabhakher
(74) *Attorney, Agent, or Firm* — Peter T. DiMauro; GE Global Patent Operation

(57) ABSTRACT

A sensor adjustment system includes an exterior housing configured to hold a directional sensor inside the housing. The directional sensor is configured to obtain data outside of the housing along a boresight of the directional sensor. The system also includes one or more fasteners configured to be operably coupled with the directional sensor inside the housing. The one or more fasteners are configured to be actuated in order to change an orientation of the boresight of the directional sensor. The one or more fasteners are configured to be actuated from outside of the housing while changing the orientation of the boresight of the directional sensor inside the housing.

14 Claims, 5 Drawing Sheets

(56) References Cited

U.S. PATENT DOCUMENTS

| | | | | |
|---|---|---|---|---|
| 8,400,560 B1* | 3/2013 | Yang | ................. | B60R 11/04 |
| | | | | 348/148 |
| 8,964,042 B2* | 2/2015 | Nozawa | ............ | H04N 5/2252 |
| | | | | 348/208.3 |
| 9,535,311 B2* | 1/2017 | Bergsten | ............ | F16M 13/022 |
| 2004/0119881 A1* | 6/2004 | Matko | ............... | B60R 11/04 |
| | | | | 348/375 |
| 2006/0115265 A1* | 6/2006 | Elberbaum | ......... | F16M 11/18 |
| | | | | 396/427 |
| 2008/0074495 A1* | 3/2008 | Lin | .................. | G02B 7/08 |
| | | | | 348/143 |
| 2008/0231699 A1* | 9/2008 | Konishi | .............. | G03B 37/02 |
| | | | | 348/143 |
| 2011/0129210 A1* | 6/2011 | McGucken | .......... | F16M 13/02 |
| | | | | 396/422 |
| 2015/0070494 A1* | 3/2015 | Hess, Jr. | ............ | H04N 17/002 |
| | | | | 348/143 |

\* cited by examiner

SYSTEM AND METHOD FOR SENSOR ADJUSTMENT

CROSS-REFERENCE TO RELATED APPLICATIONS

This application claims priority to U.S. Provisional Application No. 62/250,469, which was filed on 3 Nov. 2015, and the entire disclosure of which is incorporated herein by reference.

BACKGROUND

With an increasing emphasis on the development of smart city infrastructures, greater emphasis will be placed on the devices that can enable greater efficiencies, such as outdoor sensor devices. Sensor devices that can detect the flow and position of traffic and/or pedestrians have the potential to increase energy efficiency, since the detection and elimination of traffic jams, for example, can help reduce the use of transportation fuels. Numerous other advantages are possible in the development of smart city infrastructures. There continues to be a need for the implementation and deployment of sensor devices that are easy to maintain in the field.

BRIEF DESCRIPTION

In one embodiment, a sensor adjustment system includes an exterior housing configured to hold a directional sensor inside the housing. The directional sensor is configured to obtain data outside of the housing along a boresight of the directional sensor. The system also includes one or more fasteners configured to be operably coupled with the directional sensor inside the housing. The one or more fasteners are configured to be actuated in order to change an orientation of the boresight of the directional sensor. The one or more fasteners are configured to be actuated from outside of the housing while changing the orientation of the boresight of the directional sensor inside the housing.

In one embodiment, a sensor adjustment system includes an exterior housing configured to hold a directional sensor inside the housing. The directional sensor is configured to obtain data outside of the housing along a boresight of the directional sensor. The system also includes an elevation adjustment screw that is configured to be operably coupled with the directional sensor and change an orientation of the boresight of the directional sensor. The elevation adjustment screw is configured to be actuated from outside of the housing while changing the orientation of the boresight of the directional sensor inside the housing.

In one embodiment, a sensor adjustment system includes an exterior housing holding a camera inside the housing. The camera obtains data representative of an environment outside of the housing along a boresight of the camera. The system also includes an elevation adjustment screw operably coupled with the camera. The elevation adjustment screw changes an elevation of the boresight of the camera responsive to rotation of the elevation adjustment screw from outside the housing. The system also includes an azimuth adjustment screw operably coupled with the camera. The azimuth adjustment screw changes an azimuth of the camera responsive to movement of the azimuth adjustment screw relative to the housing.

BRIEF DESCRIPTION OF THE DRAWINGS

The above and other aspects, features, and advantages of the present disclosure will become more apparent in light of the following detailed description when taken in conjunction with the accompanying drawings in which.

DESCRIPTION

Figure 1:
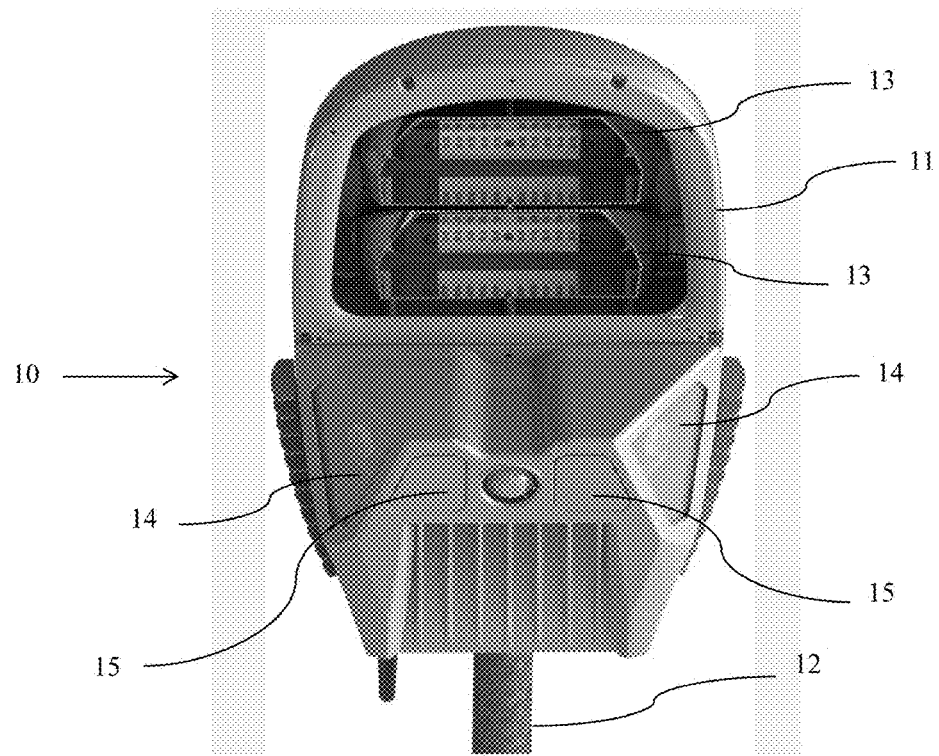
FIG. 1 is a front view of a system in which the camera and its adjustment mechanism are used.

Therefore, the present disclosure is directed to a system which incorporates a camera or other directional sensor, which may be in need of mechanical adjustment from time to time so that it is directed towards a desired position. The directional sensor can be, for example, a camera (still and/or motion), IR detector or other detector of a portion of the electromagnetic spectrum including such devices as a laser range finder or other energy transmission device that requires operation in a particular direction to locate, illuminate or image a source. It may be often incorporated into a housing and is placed behind a transparent or light transmissive (e.g., glass) window in the housing.

In particular, the directional sensor may be incorporated in an outdoor luminaire which also may provide light to an area. In many embodiments, the directional sensor may require mechanical adjustment. However, the presence of a sealed or otherwise difficult-to-open window, in front of the camera, may make it difficult to adjust the position of the camera. Therefore, in the present disclosure, the system and method disclosed herein allows for the adjustment of the position of the directional sensor (e.g., camera) from outside of the housing, and without the use of opening the window which is positioned in the housing in front of the camera enclosed within.

This external adjustment may result in a rapid commissioning of outdoor sensor systems in the field, and may save time and money as a result.

In one embodiment, the present disclosure provides a method and system for externally adjusting the bore sight of cameras, that is, adjustment from a location which is external to a housing that encloses the cameras. The enclosed housing includes one or more cameras, each of which has a bore sight that can view the region exterior of the housing via transparent or light-transmissive windows. The method and system of externally adjusting the bore sight of the one or more cameras typically is configured to maintain the pivot points of the camera at positions relatively proximate to the respective window and the pivot axes relatively proximate to the camera lens, which may allow the size of the window to be reduced or minimized relative to other systems and methods that place the pivot points in other locations.

In embodiments of this disclosure, the directional sensor (e.g. camera) may be adjusted in both its elevation (up or down relative to the ground) and azimuth (left or right) directions. This may be done by adjusting one or more screws, the movement of which will activate a mechanism that adjusts the camera(s) within the housing. Typically, the adjustment of the elevation of the camera may take place via rotation of an elevation adjustment screw, which may be accessible from the exterior of the housing. The term "accessible from the exterior of the housing" does not necessarily mean that the screw must protrude from the housing, rather, the respective screw may be accessible by opening of a door in the housing that will allow tools and/or hands to manipulate the screw from the exterior of the housing.

The mechanism that is activated that adjusts the elevation of the camera(s) within the housing, may operate in the following fashion: rotation of an elevation screw creates a reaction force in an elevation adjustment nut which in turn causes an elevation adjustment bracket to pivot up or down around an elevation pivot point. A compression force is provided by a spring (or other tensioning means) which acts across the elevation pivot point, and maintains contact between the elevation screw and the elevation adjustment nut. The function of a spring or other tensioning means is to inhibit "backlash", that is, reduce or inhibit unintentional motion. The tensioning means may also comprise a rubber gasket, a torsion spring, or many other known functional equivalents.

The mechanism that is activated that adjusts the azimuth of the camera(s) within the housing, may operate as follows: an azimuth clamp screw is loosened, and this allows the entire assembly to rotated around an azimuth pivot point.

Embodiments of the present disclosure may be considered to solve the following problems. In some conventional systems, a bore sight of a camera must be adjusted by manually manipulating the brackets that support the camera, so that the camera is moved along an azimuth axis and an elevation axis, followed by clamping the camera into a fixed position, or otherwise mechanically securing the camera into one position. However, if the camera is within an enclosure, this cannot always be easily done. If the housing happens to be elevated from the ground such as being positioned on a pole or a building (e.g., 10-15 meters from the ground), then making such adjustments represents a significant challenge.

Another design feature that may be important to the present disclosure, is to ensure that the size of the transparent or light transmissive windows in the housing is reduced or minimized, so that the housing can be kept to a small size and the camera(s) perceived to be as unobtrusive as possible.

Figure 2:
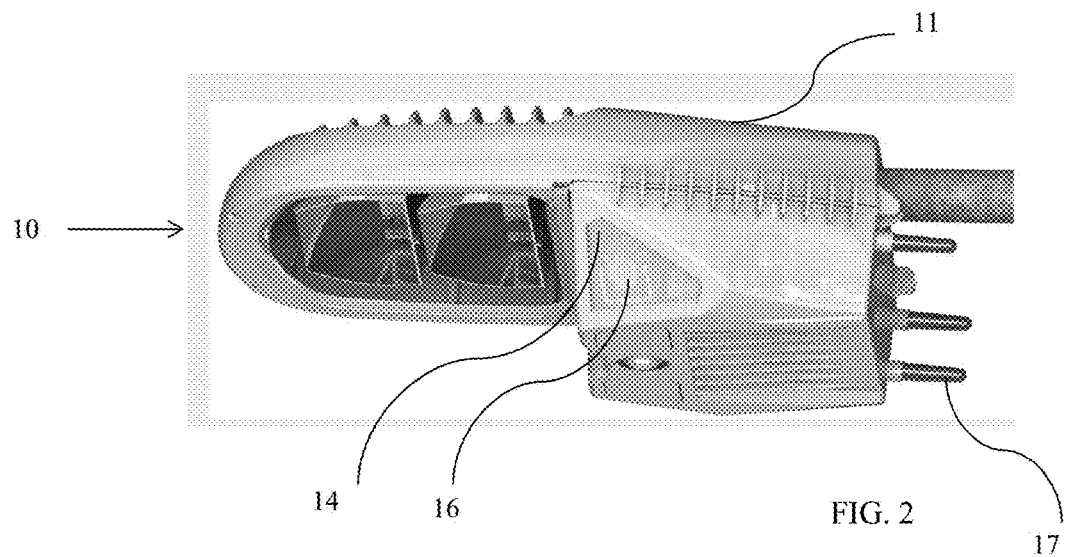
FIG. 2 is a side view of the system in which the camera and its adjustment mechanism are used.

FIGS. 1 and 2 illustrate a system in which the camera and its adjustment mechanism are used. A luminaire 10 is carried on a pole (not shown) and is coupled to the pole by connector 12. The luminaire 10 comprises a housing 11, which may typically comprise a thermoplastic material, and the housing 11 encloses one or more light emitting modules 13, which typically include one or more light emitting diodes (LEDs) or other light sources, reflectors, and lens, and the like. The light emitting modules 13 are considered to be in a forward portion of luminaire 10, that is, distal from the connector 12, while one or more windows 14 are in a rearward portion of luminaire 10. The windows 14 may be made of glass or other material which is transparent or transmissive to a wavelength of interest, and are typically (but not always) provided in the housing 11 with a means to inhibit ingress of moisture.

In the embodiment of FIGS. 1 and 2, the camera is seen as item 16 in FIG. 2, and is within the housing 11 to view the exterior environment through window 14. However, owing to the presence of window 14, it may be impractical or impossible to positionally adjust the boresight of camera 16 when desired, without removing or opening the window. Therefore, access panel 15 is provided, which can be opened to allow for access to adjustment features for moving the camera. This is most often needed at the time of initial commissioning of the luminaire 10 but can also be needed later in time, after a period in use. Finally, electrical lead(s) 17 may be used to provide power to the luminaire and the contents of its housing.

Figure 3:
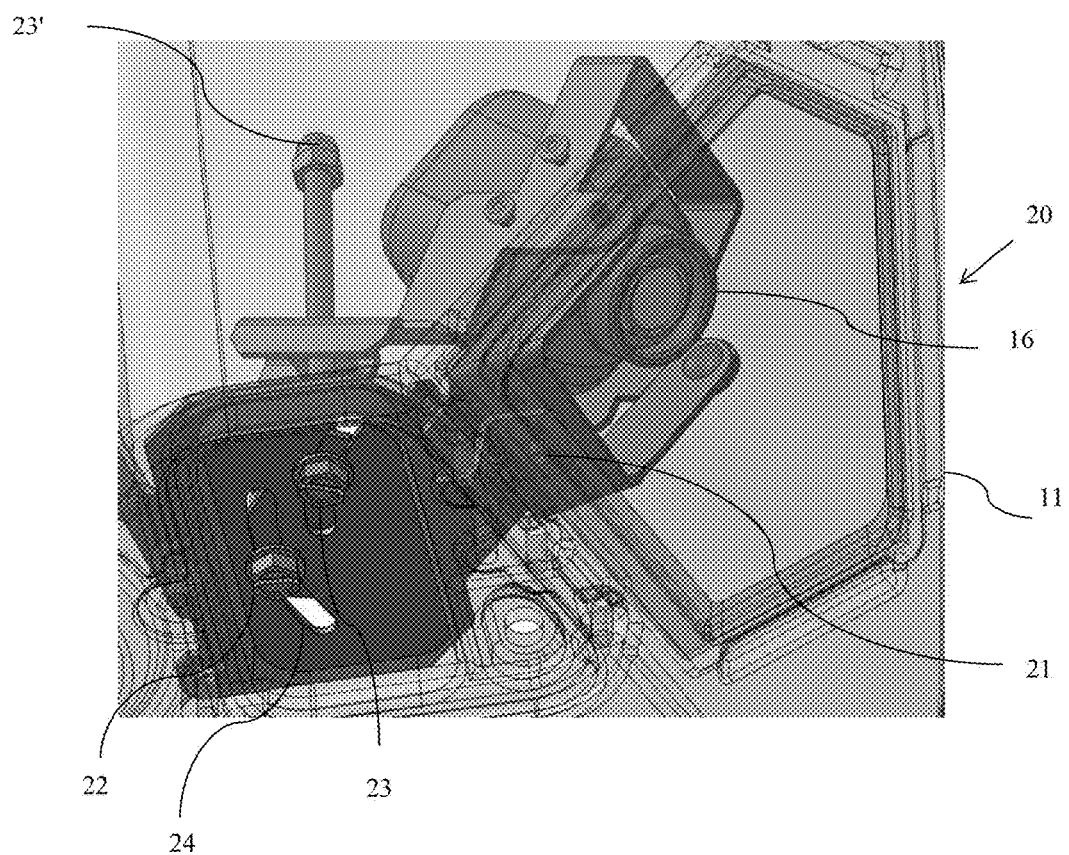
FIG. 3 is a perspective cutaway bottom view of the camera inside of housing.

FIG. 3 depicts a perspective cutaway bottom view 20 of the camera 16 inside of housing 11. This view shows how the camera 16 can be adjusted by means of the motion of one or more fasteners, such as an azimuth clamp screw 22, an elevation screw 23, and/or an azimuth clamp (not shown). Importantly, an azimuth clamp screw 22 and an elevation adjustment screw 23 are positioned within the housing 11 at a location proximate (and behind) the access panel 15, so that when access panel 15 is opened, the azimuth clamp screw 22 and the elevation adjustment screw 23 can be rotated through an opening that previously was closed by the access panel 15. At 23' is the top of the elongated elevation adjustment screw, and at 23 is the bottom of the elongated elevation adjustment screw. When azimuth clamp screw 22 is rotated or loosened, the camera 16 can be moved right or left around the azimuth pivot point 21. Azimuth adjustment occurs via loosening azimuth clamp screw 22 and manually rotating the entire internal assembly around the azimuth pivot point 21. Clearance slots 24 in the mounting plate for the camera allow for motion of screws during azimuth adjustment.

Figure 4:
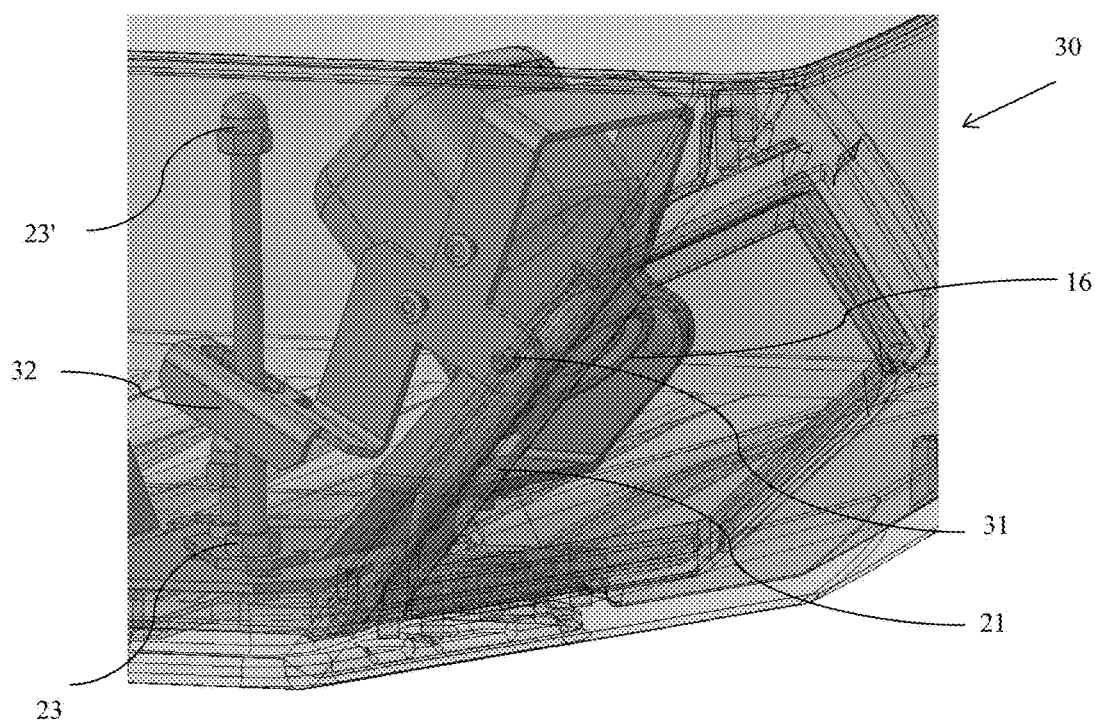
FIG. 4 is a different cutaway perspective view of the camera inside housing.

FIG. 4 depicts a different cutaway perspective view 30 of camera 16 inside housing 11. In this view, the full length of elevation adjustment screw 23, 23' can be seen, and how the latter threads onto elevation adjustment bracket 32. Rotation of elevation adjustment screw 23, 23' causes the elevation adjustment bracket 32 to move the camera 16 around an elevation pivot point 31. Elevation adjustment occurs via rotation of the elevation adjustment screw 23 from the exterior of housing 11. The rotation of elevation adjustment screw 23, 23' creates a reaction force in an elevation adjustment nut (not shown) which in turn causes the elevation adjustment bracket 32 to pivot up or down around elevation pivot point 31. A spring acting across the elevation pivot point 31 keeps the mechanism in compression and maintains the adjustment.

Figure 5:
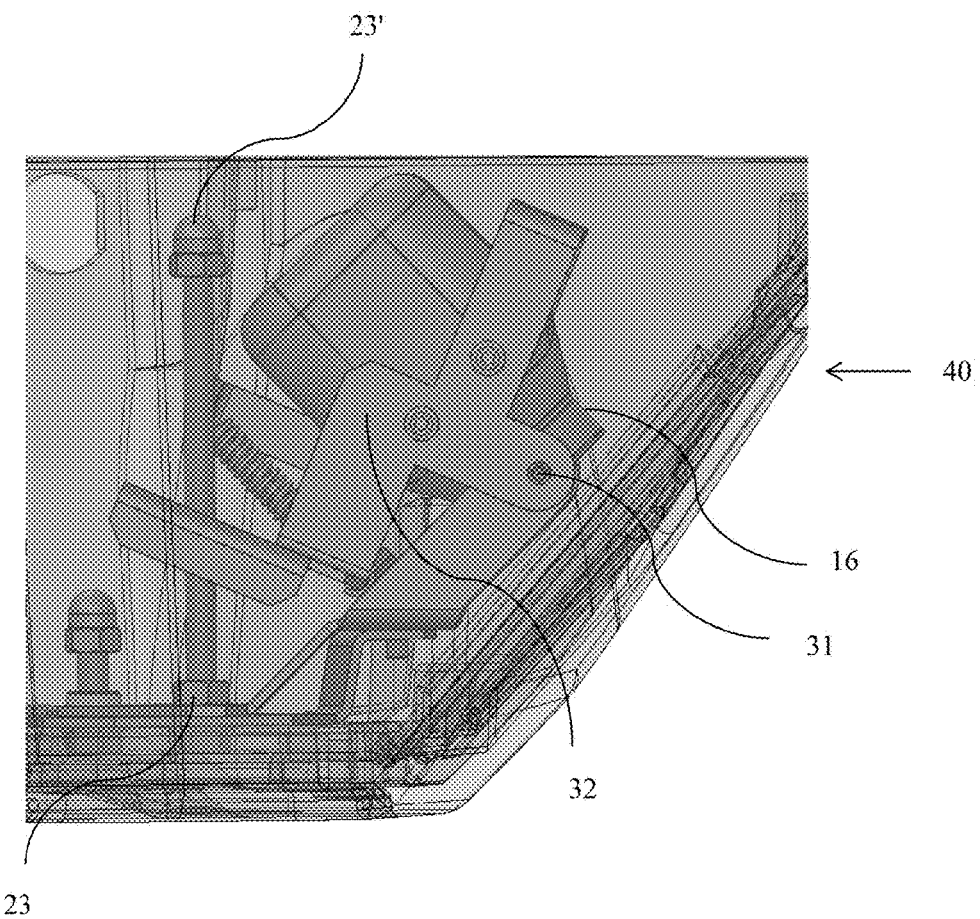
FIG. 5 is a side cutaway perspective view of the camera inside housing.
Figure 6:
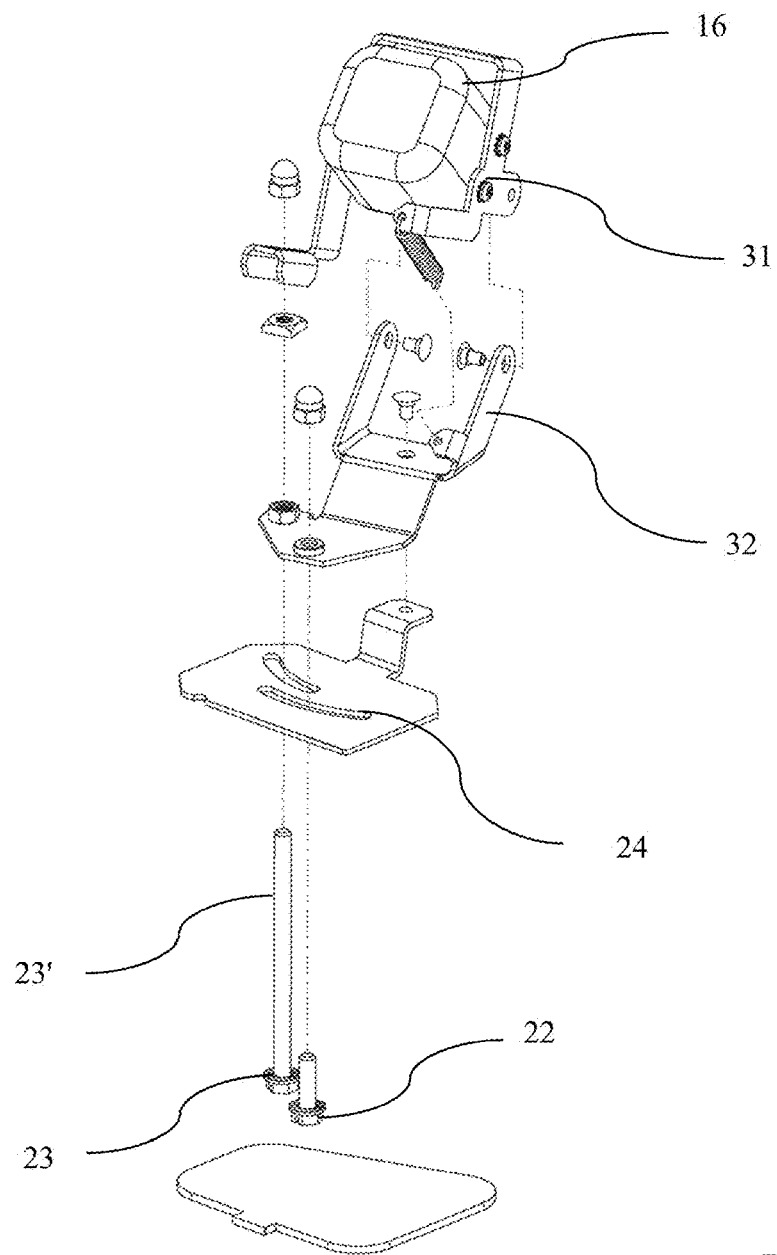

FIG. 5 shows a side cutaway perspective view 40 of the camera 16 inside housing 11, clearly showing that the camera can pivot up and down around elevation pivot point 31 when elevation adjustment bracket 32 is caused to move by rotation of elevation adjustment screw 23, 23'. FIG. 6 is an exploded view of the system for sensor adjustment (with housing 11 removed), with like elements numbered the same as in FIGS. 1-5.

In one or more embodiments of the inventive subject matter described herein, the pivot points (e.g., the aximuth pivot point and the elevation pivot point) are located inside the housing 11 in locations that are close to the window 14. For example, the pivot points may be inside the housing 11 in locations that are closer to the window 14 than the largest dimension of the window 14. Optionally, the pivot points may be located closer to the lens of the camera in order to reduce how far the lens can be moved when the orientation of the camera is adjusted. For example, the pivot points may be closer to the lens of the camera than the largest dimension of the window 14. This can allow for the window 14 to be smaller relative to the pivot points be located farther from the lens of the camera.

In one embodiment, a sensor adjustment system includes an exterior housing configured to hold a directional sensor inside the housing. The directional sensor is configured to obtain data outside of the housing along a boresight of the directional sensor. The system also includes one or more fasteners configured to be operably coupled with the directional sensor inside the housing. The one or more fasteners are configured to be actuated in order to change an orientation of the boresight of the directional sensor. The one or more fasteners are configured to be actuated from outside of the housing while changing the orientation of the boresight of the directional sensor inside the housing.

In one aspect, the one or more fasteners include an elevation adjustment screw that is configured to be operably coupled with the directional sensor and change an elevation of the boresight of the directional sensor responsive to rotation of the elevation adjustment screw from outside of the housing.

In one aspect, the system also includes a bracket configured to be operably coupled with the directional sensor. The one or more fasteners can include an elevation adjustment screw that is configured to be operably coupled with the bracket and to pivot the bracket responsive to rotation of the elevation adjustment screw from outside of the housing.

In one aspect, the bracket is configured to be connected with the housing at a pivot point and the elevation adjustment screw is configured to pivot the bracket about the pivot point to change an elevation of the boresight of the directional sensor responsive to the rotation of the elevation adjustment screw from outside of the housing.

In one aspect, the one or more fasteners include an azimuth adjustment screw that is configured to be operably coupled with the directional sensor and change an azimuth of the boresight of the directional sensor responsive to rotation of the azimuth adjustment screw from outside of the housing.

In one aspect, the system also includes a bracket configured to be operably coupled with the directional sensor. The one or more fasteners can include an azimuth adjustment screw that is configured to be operably coupled with the bracket and to pivot the bracket responsive to movement of the azimuth adjustment screw from outside of the housing.

In one aspect, the bracket is configured to be connected with the housing at a pivot point and includes a clearance slot through which the azimuth adjustment screw extends. The azimuth adjustment screw can be configured to be loosened from outside of the housing and move within the clearance slot relative to the bracket to pivot the bracket about the pivot point to change an azimuth of the boresight of the directional sensor.

In one aspect, the one or more fasteners include an elevation adjustment screw and an azimuth adjustment screw. The elevation adjustment screw can be configured to be operably coupled with the directional sensor and change an elevation of the boresight of the directional sensor responsive to rotation of the elevation adjustment screw from outside of the housing, the azimuth adjustment screw configured to be operably coupled with the directional sensor and change an azimuth of the boresight of the directional sensor responsive to movement of the azimuth adjustment screw from outside of the housing.

In one aspect, the elevation adjustment screw is configured to change the elevation of the boresight of the directional sensor independent of movement of the azimuth adjustment screw and the azimuth adjustment screw is configured to change the azimuth of the boresight of the directional sensor independent of rotation of the elevational adjustment screw.

In one aspect, the housing includes an opening that is closed by an access panel of the housing. The access panel can be configured to be moved to provide access to both the elevation adjustment screw and the azimuth adjustment screw through the opening.

In one aspect, the housing includes a window through which the one or more fasteners are accessible. The one or more fasteners can include plural fasteners configured to be actuated to pivot the directional sensor about an elevation pivot point and about an azimuth pivot point inside the housing to change the orientation of the boresight of the directional sensor. The elevation pivot point and the azimuth pivot point can be located proximate to the window and to a lens of the directional sensor.

In one embodiment, a sensor adjustment system includes an exterior housing configured to hold a directional sensor inside the housing. The directional sensor is configured to obtain data outside of the housing along a boresight of the directional sensor. The system also includes an elevation adjustment screw that is configured to be operably coupled with the directional sensor and change an orientation of the boresight of the directional sensor. The elevation adjustment screw is configured to be actuated from outside of the housing while changing the orientation of the boresight of the directional sensor inside the housing.

In one aspect, the system also can include a bracket configured to be operably coupled with the directional sensor. The elevation adjustment screw can be configured to be operably coupled with the bracket and to pivot the bracket responsive to rotation of the elevation adjustment screw from outside of the housing.

In one aspect, the bracket is configured to be connected with the housing at a pivot point and the elevation adjustment screw is configured to pivot the bracket about the pivot point to change an elevation of the boresight of the directional sensor responsive to the rotation of the elevation adjustment screw from outside of the housing.

In one aspect, the system also includes an azimuth adjustment screw that is configured to be operably coupled with the directional sensor and change an azimuth of the boresight of the directional sensor responsive to rotation of the azimuth adjustment screw from outside of the housing.

In one aspect, the system also includes a bracket configured to be operably connected with the directional sensor and operably connected with the housing at a pivot point. The bracket can include a clearance slot through which the azimuth adjustment screw extends. The azimuth adjustment screw can be configured to be loosened from outside of the housing and move within the clearance slot relative to the bracket to pivot the bracket about the pivot point to change an azimuth of the boresight of the directional sensor.

In one aspect, the elevation adjustment screw is configured to change an elevation of the boresight of the directional sensor independent of movement of the azimuth adjustment screw and the azimuth adjustment screw is configured to change the azimuth of the boresight of the directional sensor independent of rotation of the elevational adjustment screw.

In one aspect, the housing includes an opening that is closed by an access panel of the housing. The access panel can be configured to be moved to provide access to both the elevation adjustment screw and the azimuth adjustment screw through the opening.

In one embodiment, a sensor adjustment system includes an exterior housing holding a camera inside the housing. The camera obtains data representative of an environment outside of the housing along a boresight of the camera. The system also includes an elevation adjustment screw operably coupled with the camera. The elevation adjustment screw changes an elevation of the boresight of the camera responsive to rotation of the elevation adjustment screw from outside the housing. The system also includes an azimuth adjustment screw operably coupled with the camera. The azimuth adjustment screw changes an azimuth of the camera responsive to movement of the azimuth adjustment screw relative to the housing.

In one aspect, the housing includes an opening that is closed by an access panel of the housing. The access panel can be moved to provide access to both the elevation adjustment screw and the azimuth adjustment screw through the opening.

In one aspect, the elevation adjustment screw changes the elevation of the boresight of the directional sensor independent of movement of the azimuth adjustment screw and the azimuth adjustment screw changes the azimuth of the boresight of the directional sensor independent of rotation of the elevational adjustment screw.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. A sensor adjustment system comprising:
an exterior housing configured to hold more than one camera inside the housing, each camera configured to obtain data outside of the housing along a boresight of each camera; and
one or more fasteners configured to be operably coupled with each individual camera inside the housing, the one or more fasteners configured to be actuated in order to change an orientation of the boresight of each individual camera, wherein the one or more fasteners are configured to be actuated from outside of the housing while changing the orientation of the boresight of each individual camera inside the housing,
where the one or more fasteners of each individual camera include an azimuth adjustment screw that is configured to be operably coupled with the respective camera and change an azimuth of the boresight of the respective camera responsive to rotation of the azimuth adjustment screw from outside of the housing;
wherein the one or more fasteners further includes an elevation adjustment screw that is configured to be operably coupled with the respective camera and change an elevation of the boresight of the respective camera responsive to rotation of the elevation adjustment screw from outside of the housing;
wherein the elevation adjustment screw is configured to change the elevation of the boresight of each individual camera independent of movement of the azimuth adjustment screw and the azimuth adjustment screw is configured to change the azimuth of the boresight of each individual camera independent of rotation of the elevation adjustment screw.

2. The sensor system of claim 1, further comprising a bracket configured to be operably coupled with each individual camera, wherein the one or more fasteners include an elevation adjustment screw that is configured to be operably coupled with the bracket and to pivot the bracket responsive to rotation of the elevation adjustment screw from outside of the housing.

3. The sensor adjustment system of claim 2, wherein the bracket is configured to be connected with the housing at a pivot point and the elevation adjustment screw is configured to pivot the bracket about the pivot point to change an elevation of the boresight of each camera responsive to the rotation of the elevation adjustment screw from outside of the housing.

4. The sensor adjustment system of claim 1, further comprising a bracket configured to be operably coupled with each individual camera, wherein the azimuth adjustment screw is configured to be operably coupled with the bracket and to pivot the bracket responsive to movement of the azimuth adjustment screw from outside of the housing.

5. The sensor adjustment system of claim 4, wherein the bracket is configured to be connected with the housing at a pivot point and includes a clearance slot through which the azimuth adjustment screw extends, wherein the azimuth adjustment screw is configured to be loosened from outside of the housing and move within the clearance slot relative to the bracket to pivot the bracket about the pivot point to change the azimuth of the boresight of each camera.

6. The sensor adjustment system of claim 1, wherein the housing includes an opening that is closed by an access panel of the housing, wherein the access panel is configured to be moved to provide access to both the elevation adjustment screw and the azimuth adjustment screw through the opening.

7. The sensor adjustment system of claim 1, wherein the housing includes more than one window through which the one or more fasteners are accessible, and wherein the one or more fasteners include plural fasteners configured to be actuated to pivot each individual camera about an elevation pivot point and about an azimuth pivot point inside the housing to change the orientation of the boresight of each individual camera wherein the elevation pivot point and the azimuth pivot point are located proximate to each window and to a lens of each camera.

8. A sensor adjustment system comprising:
an exterior housing configured to hold more than one camera inside the housing, each of the more than one camera configured to obtain data outside of the housing along a boresight of each of the more than one camera;
an elevation adjustment screw that is configured to be operably coupled with each of the more than one camera and change an orientation of the boresight of each individual camera, wherein the elevation adjustment screw is configured to be actuated from outside of the housing while changing the orientation of the boresight of each individual camera inside the housing; and
an azimuth adjustment screw that is configured to be operably coupled with each of the more than one camera and change an azimuth of the boresight of each individual camera responsive to rotation of the azimuth adjustment screw from outside of the housing;
wherein each elevation adjustment screw is configured to change the elevation of the boresight of each individual camera independent of movement of each azimuth adjustment screw, and each azimuth adjustment screw is configured to change the azimuth of the boresight of each individual camera independent of rotation of each elevational adjustment screw.

9. The sensor adjustment system of claim 8, further comprising a bracket configured to be operably coupled with each individual camera, wherein the elevation adjustment screw is configured to be operably coupled with the bracket and to pivot the bracket responsive to rotation of the elevation adjustment screw from outside of the housing.

10. The sensor adjustment system of claim 9, wherein the bracket is configured to be connected with the housing at a pivot point and the elevation adjustment screw is configured to pivot the bracket about the pivot point to change an elevation of the boresight of each individual camera responsive to the rotation of the elevation adjustment screw from outside of the housing.

11. The sensor adjustment system of claim 8, further comprising a bracket configured to be operably connected with each individual camera and operably connected with the housing at a pivot point, the bracket including a clearance slot through which the azimuth adjustment screw extends, wherein the azimuth adjustment screw is configured to be loosened from outside of the housing and move within the clearance slot relative to the bracket to pivot the bracket about the pivot point to change an azimuth of the boresight of each individual camera.

12. The sensor adjustment system of claim 8, wherein the housing includes an opening that is closed by an access panel of the housing, wherein the access panel is configured to be moved to provide access to both the elevation adjustment screw and the azimuth adjustment screw through the opening.

13. A sensor adjustment system comprising:
an exterior housing holding more than one camera inside the housing, each of the more than one camera obtaining data representative of an environment outside of the housing along a boresight of the camera;
an elevation adjustment screw operably coupled with each individual camera, the elevation adjustment screw changing an elevation of the boresight of each individual camera responsive to rotation of the elevation adjustment screw from outside the housing; and
an azimuth adjustment screw operably coupled with each individual camera, the azimuth adjustment screw changing an azimuth of each individual camera responsive to movement of the azimuth adjustment screw relative to the housing;
wherein the elevation adjustment screw is configured to change the elevation of the boresight of each individual camera independent of movement of the azimuth adjustment screw and the azimuth adjustment screw is configured to change the azimuth of the boresight of each individual camera independent of rotation of the elevational adjustment screw.

14. The sensor adjustment system of claim 13, wherein the housing includes an opening that is closed by an access panel of the housing, wherein the access panel is moved to provide access to both the elevation adjustment screw and the azimuth adjustment screw through the opening.

* * * * *